US010306830B2

(12) United States Patent
Nolin et al.

(10) Patent No.: US 10,306,830 B2
(45) Date of Patent: Jun. 4, 2019

(54) WINDING MECHANISM FOR A STRING TRIMMER HEAD

(71) Applicant: TTI (MACAO COMMERCIAL OFFSHORE) LIMITED, Macau (MO)

(72) Inventors: Eric Nolin, Anderson, SC (US); Ronald J. Hoffman, Iva, SC (US); Christopher A. Holman, Clemson, SC (US)

(73) Assignee: TTI (MACAO COMMERCIAL OFFSHORE) LIMITED, Macau (MO)

(*) Notice: Subject to any disclaimer, the term of this patent is extended or adjusted under 35 U.S.C. 154(b) by 21 days.

(21) Appl. No.: 15/448,347

(22) Filed: Mar. 2, 2017

(65) Prior Publication Data
US 2017/0251594 A1    Sep. 7, 2017

Related U.S. Application Data

(60) Provisional application No. 62/302,983, filed on Mar. 3, 2016.

(51) Int. Cl.
*A01D 34/416*    (2006.01)
(52) U.S. Cl.
CPC ..... *A01D 34/4166* (2013.01); *A01D 34/4163* (2013.01)
(58) Field of Classification Search
CPC ............ A01D 34/4166; A01D 34/4163; B65H 54/02; B65H 54/44; B65H 54/74; G04D 1/08; B25B 13/48; B25B 13/065; B25B 13/50
USPC ........... 30/276; 81/6, 176.1; 242/395, 486.9, 242/487
See application file for complete search history.

(56) References Cited

U.S. PATENT DOCUMENTS

| 124,178 A | * | 2/1872 | Walter |
| 2,360,163 A | * | 10/1944 | Sadler .................... A62C 33/00 81/176.1 |
| 5,163,632 A | | 11/1992 | Chilcoat |
| D406,993 S | * | 3/1999 | Jones ............................... D8/28 |
| 5,884,859 A | * | 3/1999 | Ma ......................... A45B 25/14 135/20.3 |
| 6,254,029 B1 | | 7/2001 | Robertson |

(Continued)

FOREIGN PATENT DOCUMENTS

EP    3 213 619 A1 *   9/2017

OTHER PUBLICATIONS

European Search Report for Application No. 17159227.2 dated May 23, 2017 (8 pages).

*Primary Examiner* — Hwei-Siu C Payer
(74) *Attorney, Agent, or Firm* — Michael Best & Friedrich LLP (57) ABSTRACT

A winding mechanism, a string trimmer head, and a method of winding line. The head may include a body, and a spool supported by the body, a line being supportable by the spool. The winding mechanism may include a crank engageable to rotate the spool to wind the line onto the spool. The trimmer head may include a bump knob engageable with the spool, and the crank may include a crank body engageable with the bump knob to rotate the spool. The crank may further include an arm connected to the crank body and a handle connected to the arm and engageable by a user to pivot the crank.

11 Claims, 7 Drawing Sheets

(56) References Cited

U.S. PATENT DOCUMENTS

| | | | |
|---|---|---|---|
| 6,276,242 B1 * | 8/2001 | Wiggins | B25B 13/02 |
| | | | 81/119 |
| 6,651,921 B1 | 11/2003 | Travis | |
| 6,726,143 B1 | 4/2004 | Mills | |
| 6,854,185 B1 | 2/2005 | Alliss | |
| 6,944,954 B1 | 9/2005 | Arnetoli | |
| 7,000,505 B2 * | 2/2006 | Hsien | B25B 13/065 |
| | | | 81/121.1 |
| 7,017,272 B2 | 3/2006 | Grace | |
| 7,395,601 B2 | 7/2008 | Berfield | |
| 7,412,768 B2 | 8/2008 | Alliss | |
| 7,607,232 B2 | 10/2009 | Pfaltzgraff | |
| 8,025,249 B2 | 9/2011 | Alliss | |
| D661,969 S * | 6/2012 | Biddle | D8/308 |
| 9,380,743 B2 * | 7/2016 | Alliss | A01D 34/4162 |
| 2002/0189107 A1 | 12/2002 | Arnetoli | |
| 2006/0254060 A1 | 11/2006 | Alliss | |
| 2006/0254061 A1 | 11/2006 | Alliss | |
| 2009/0151484 A1 * | 6/2009 | Mullen | B65H 75/40 |
| | | | 74/47 |
| 2011/0225832 A1 | 9/2011 | Alliss | |
| 2011/0302793 A1 | 12/2011 | Alliss | |
| 2012/0066913 A1 | 3/2012 | Alliss | |
| 2012/0085855 A1 | 4/2012 | Mitchell | |
| 2012/0199681 A1 * | 8/2012 | Bagley | A47J 43/255 |
| | | | 241/273.1 |
| 2015/0150191 A1 | 6/2015 | Alliss | |
| 2015/0327436 A1 | 11/2015 | Skinner | |
| 2015/0342116 A1 | 12/2015 | Sprungman | |
| 2017/0251594 A1 * | 9/2017 | Nolin | A01D 34/4166 |

* cited by examiner

WINDING MECHANISM FOR A STRING TRIMMER HEAD

CROSS-REFERENCE TO RELATED APPLICATION

This application claims priority to U.S. Provisional Patent Application No. 62/302,983, filed on Mar. 3, 2016, the entire contents of which is hereby incorporated by reference.

FIELD

The present invention relates to trimmers and, more particularly, to a winding mechanism for a string trimmer head.

SUMMARY

Generally, trimmers are used to cut grass and weeds and are often used to edge around trees, near fences and walls, and along landscape borders. Conventional string trimmers include an elongated shaft with a rotating element or gear head near the end of the elongated shaft, and a spool or string head is attached to the gear head. Typically, the string head includes a monofilament line (i.e., trimmer line) rotated by the gear head for cutting and trimming along landscaped areas, fences, walls, etc.

In one independent aspect, a winding mechanism for a string trimmer head may be provided. The head may include a body connectable to and drivable by a drive shaft of a string trimmer, and a spool supportable by the body, line being supportable by the spool. The mechanism may generally include a crank engageable to rotate the spool when the spool is supported by the body to wind the line onto the spool.

In some constructions, the trimmer head may include a bump knob engageable with the spool, and the crank may include a crank body engageable with the bump knob to rotate the spool. The crank may also include an arm connected to the crank body and a handle connected to the arm and engageable by a user to pivot the crank.

In another independent aspect, a string trimmer head assembly may be provided. The assembly may be for use with a string trimmer, the trimmer including a drive shaft. The assembly may generally include a trimmer head including a body connectable to and drivable by the drive shaft, a spool supportable by the body, and a rotatable member rotatable relative to the body and engageable with the spool, line being supportable by the spool; and a winding mechanism engageable with the rotatable member and operable, when the spool is supported by the body, to wind line onto the spool.

In some constructions, the winding mechanism may include a crank with a crank body engageable with the bump knob, an arm connected to the crank body, and a handle connected to the arm and engageable by a user to pivot the crank and, therethrough, the bump knob and the spool to wind line onto the spool.

In yet another independent aspect, a method of winding line in a string trimmer head may be provided. The head may include a body connectable to and drivable by a drive shaft of a string trimmer, a spool supportable by the body, and a bump knob engageable with the spool, line being supportable by the spool. The method may generally include, with the spool supported by the body, engaging the bump knob with a crank; and pivoting the crank to wind the line onto the spool.

In further independent aspect, a string trimmer may be provided. The trimmer may generally include a housing; a motor supported by the housing; a drive shaft driven by the motor; and a head assembly. The assembly may include a trimmer head including a body connectable to and drivable by the drive shaft, a spool supportable by the body, and a rotatable member rotatable relative to the body and engageable with the spool, line being supportable by the spool; and a winding mechanism engageable with the rotatable member and operable, when the spool is supported by the body, to wind line onto the spool.

In another independent aspect, a method of winding line in a string trimmer may be provided. The trimmer may generally include a housing, a motor supported by the housing, a drive shaft driven by the motor, and a head assembly. The assembly may include a trimmer head including a body connectable to and drivable by the drive shaft, a spool supportable by the body, and a bump knob engageable with the spool, line being supportable by the spool; and a winding mechanism. The method may generally include, with the body connected to the drive shaft, engaging the bump knob with a crank; and pivoting the crank to wind the line onto the spool.

Other independent aspects of the invention will become apparent by consideration of the detailed description and accompanying drawings.

DETAILED DESCRIPTION

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof.

Figure 1:
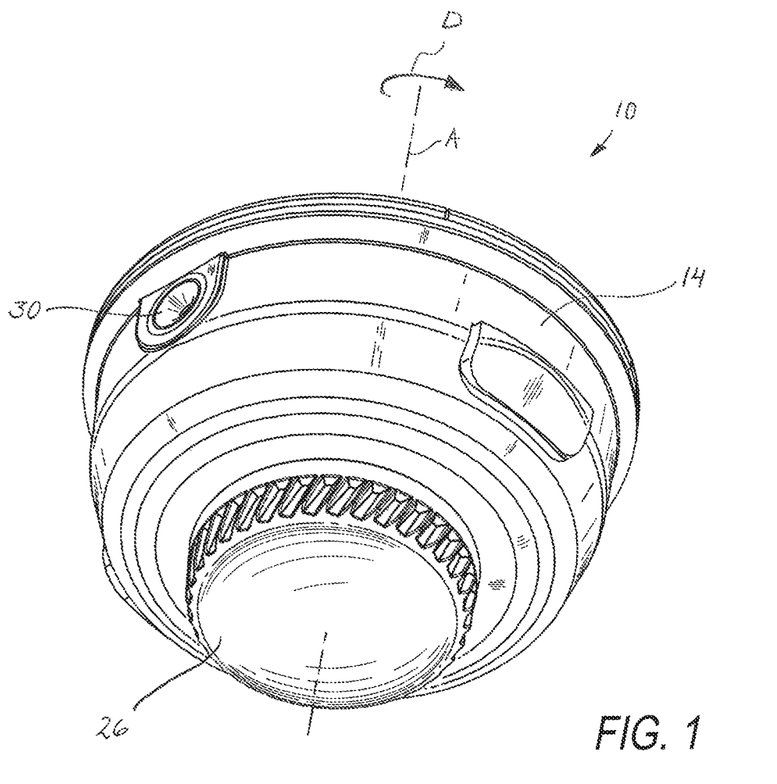
FIG. 1 is a bottom perspective view of a trimmer head.
Figure 2:
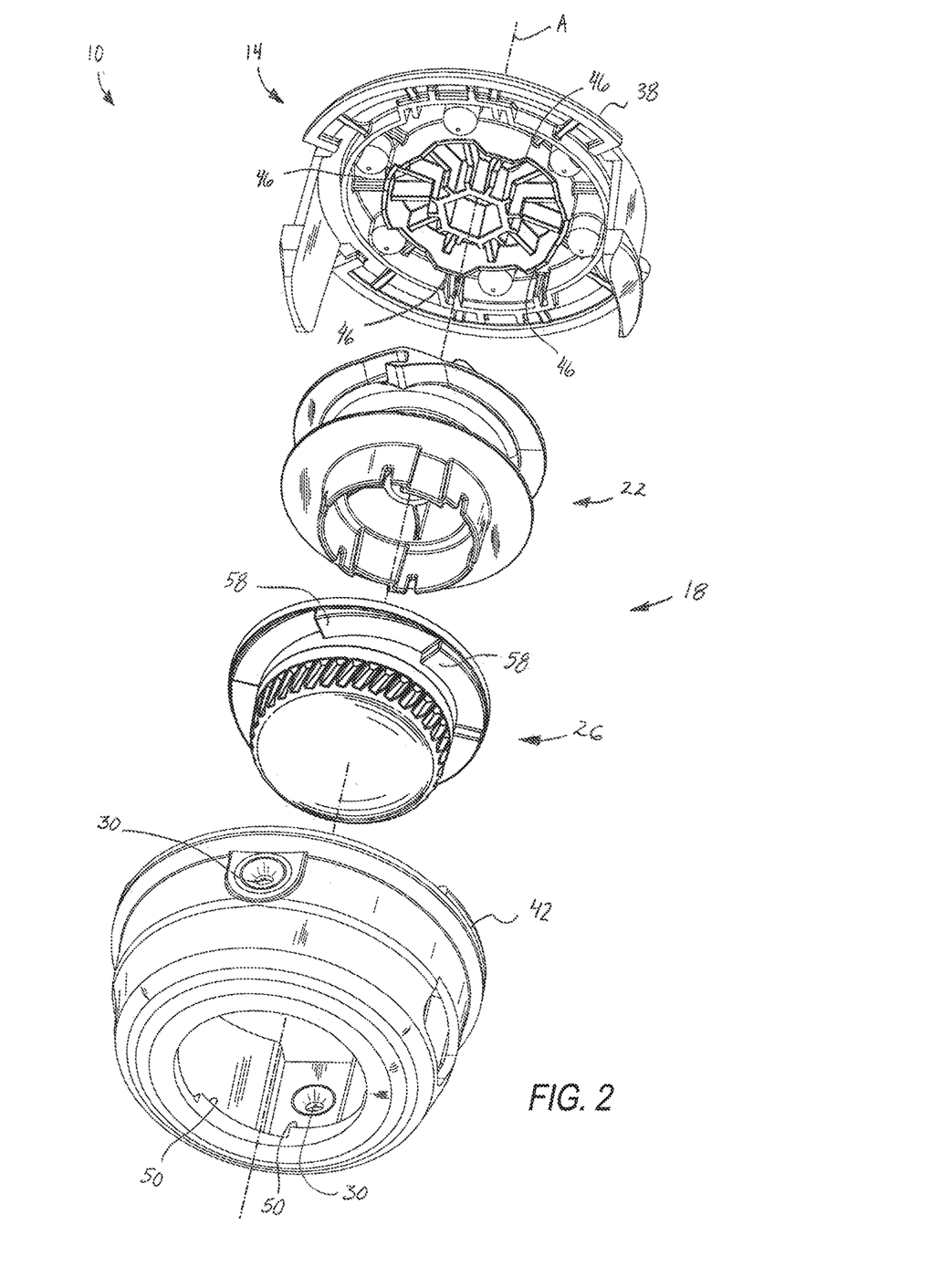
FIG. 2 is a bottom perspective exploded view of the trimmer head.
Figure 3:
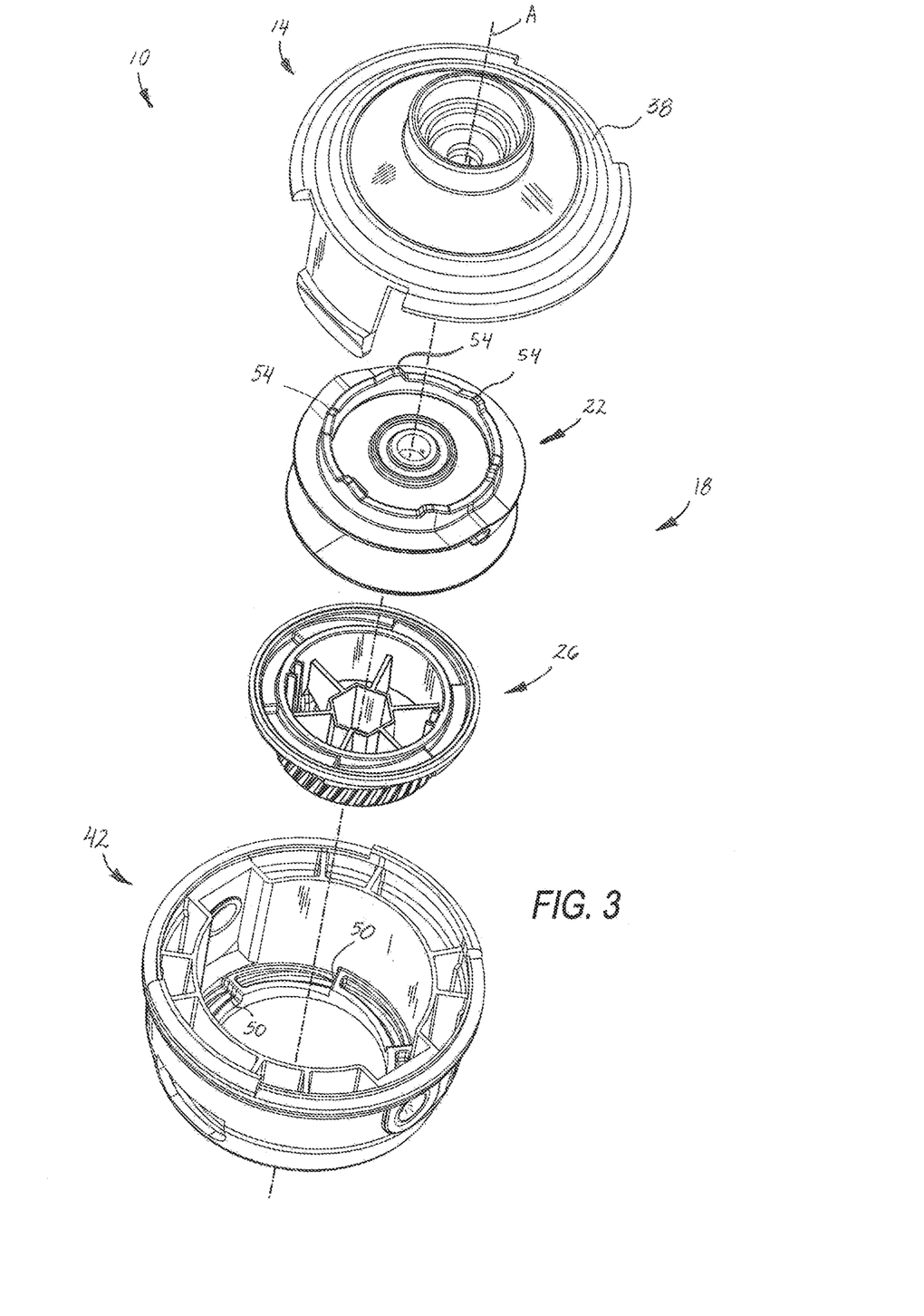
FIG. 3 is a top perspective exploded view of the trimmer head.

FIGS. 1-3 illustrate a string trimmer head 10 for use on an exemplary string trimmer (not shown). Such a trimmer generally includes a shaft with a handle toward one end and a motor housing enclosing an electric motor with a motor-driven output or drive shaft (not shown) for connection to a trimmer head on the other end. Various powered trimmers (e.g., battery-powered, gas-powered, etc.) may be used with the trimmer head 10. Exemplary trimmers are described and illustrated in U.S. Pat. No. 8,464,431, issued on Jun. 18, 2013, and in U.S. Pat. No. 6,108,914, issued Aug. 29, 2000, the entire contents of both of which are hereby incorporated by reference.

Figure 8:
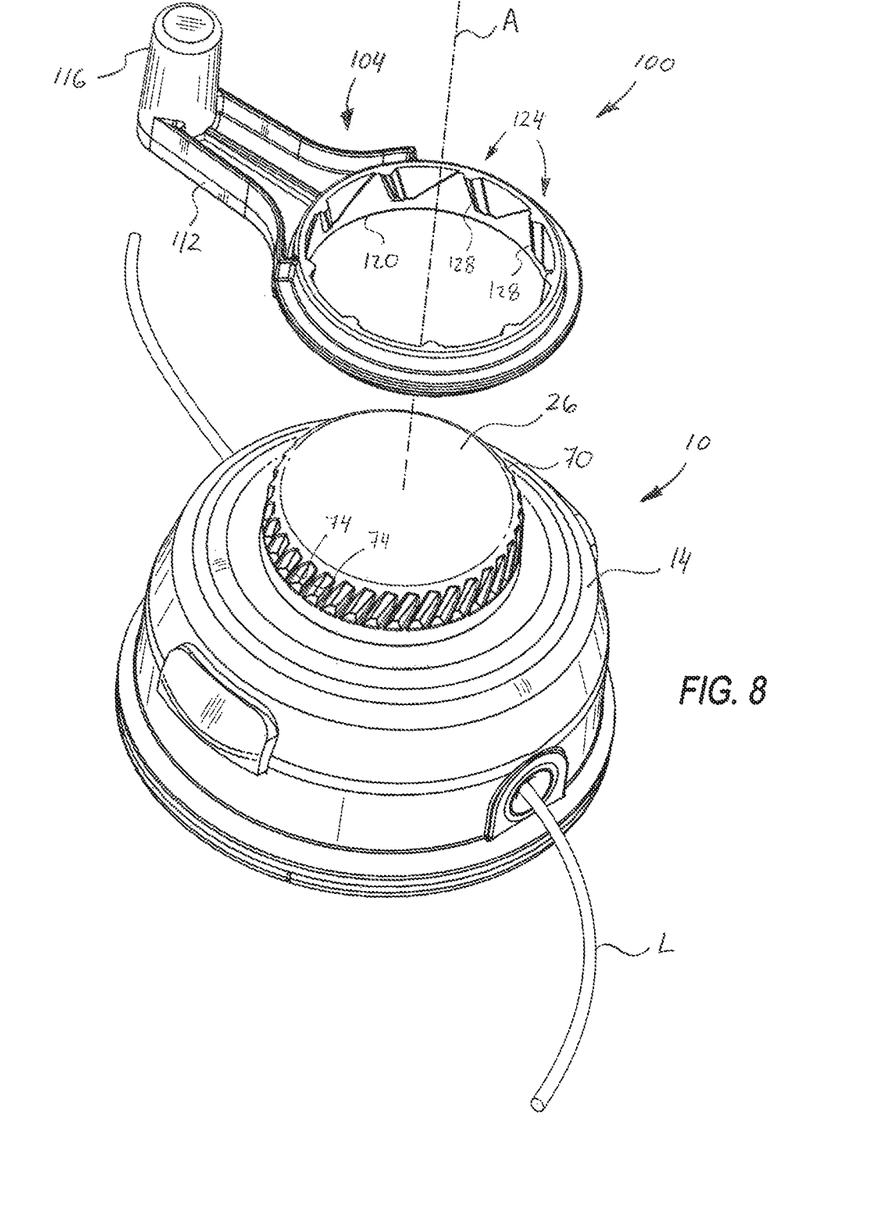
FIG. 8 is a bottom perspective view of the trimmer head of FIG. 1 illustrating the winding mechanism of FIG. 6 disengaged the bump knob of the trimmer head.

With continued reference to FIGS. 2-3, the illustrated trimmer head 10 includes a body 14 having a central axis of rotation A and supporting a feed mechanism 18 for selectively feeding one or more lines L (FIGS. 8-9) to cut grass, weeds, etc. The feed mechanism 18 generally includes a spool 22 supporting the line(s) L and a rotatable bump knob 26. Although not shown, the line(s) L are wound on the spool 22. A pair of opposed apertures 30 in the body 14 receive the line(s) L.

The body 14 includes a top portion 38 and a bottom portion 42 coupled together by a pair of snap-fit arms extending from the top portion 38 and, as shown in FIG. 1, receivable in corresponding openings defined in the bottom portion 42. The top portion 38 has (see FIG. 2) a plurality of top projections 46 extending generally axially downwardly from an interior surface of the top portion 38. The bottom portion 42 has (see FIG. 3) a plurality of bottom projections 50 extending generally axially upwardly from an interior surface of the bottom portion 42. The projections 46, 50 are spaced circumferentially about the central axis A, and the top projections 46 are circumferentially offset from the bottom projections 50.

The spool 22 includes (see FIG. 3) a plurality of spool projections 54 extending axially upwardly from the spool 22 to selectively engage with the top projections 46 of the body 14. The bump knob 26 also includes (see FIG. 2) a plurality of ramp projections 58 extending axially downwardly from a radial flange 66 of the bump knob 26 to selectively engage with the bottom projections 50 of the body 14, which are also ramped. In some constructions (not shown), the bump knob ramp projections 58 may extend from the spool 22.

The feed mechanism 18 includes the projections 46, 50 of the body 14, the spool projections 54 of the spool 22, and the ramp projections 58 of the bump knob 26. In operation, while the trimmer head 10 is being rotated by the trimmer drive shaft in a driving direction D (FIG. 1), pushing the bump knob 26 axially toward the top portion 38 (i.e., upwardly) (e.g., by tapping the bump knob 26 on the ground) disengages the body projections 50 and the bump projections 58. As the body 14 continues to rotate, the spool 22 and the bump knob 26 slow and relatively rotate opposite the driving direction D a partial turn about the axis A until the spool projections 54 contact the top projections 46 to inhibit further relative rotation. During this relative rotation, line L is dispensed.

Disengaging the bump knob 26 with the ground allows a spring (not shown) to move the spool 22 toward the bottom portion 42 (i.e., downwardly), disengaging the body projections 46 and the spool projections 54. As the body 14 continues to rotate, the spool 22 and the bump knob 26 slow and relatively rotate opposite the driving direction D a partial turn about the axis A until the bump projections 58 contact the bottom projections 50 to inhibit further relative rotation. During this relative rotation, line L is again dispensed (e.g., proportionally fed out of each aperture 30).

When first using the trimmer head 10 or once the line(s) L has been fully dispensed, line L may be loaded onto the spool 22 with the spool 22 supported on the body 14 without disconnecting the body portions 38, 42 to access the spool 22. To do so, line L is fed through each aperture 30. In some constructions, the line L is a single line fed through one aperture 30, through the body 14 and the spool 22 and out the opposite aperture 30. In other constructions, a line L may be fed into each aperture 30 with the interior end of the line L being held inside the body 14 (e.g., in a holding device (a tapered opening, a clamp, etc.) provided in the spool 22).

Once line L is fed through each opening 30, the spool 22 is rotated to wind or wrap the line(s) L onto the spool 22. In some constructions, the user simply manually rotates the bump knob 26 to turn the spool 22 and wind/wrap the line(s) L around the spool 22. However, such manual rotation of the spool 22 (e.g., through grasping and turning the bump knob 26) may be undesirable (e.g., tedious, time-consuming, tiring, etc.).

The ramped surfaces of the spool projections 54 and the bump projections 58 provide ratcheting mechanisms with the body projections 46, 50, respectively. Accordingly, the spool 22 and the bump knob 26 may be rotated in a winding direction W (FIG. 9) (which, in the illustrated construction, is the same as the driving direction D as the trimmer) about the axis A to wind the line(s) L onto the spool 22 and are prevented from rotating in the opposite direction. When the bump knob 26 is not bumped, the bottom projections 50 ride up the bump knob ramp projections 58 to allow the bump knob 26 and the spool 22 to be rotated in the winding direction W to wind/wrap the line L.

Figure 4:
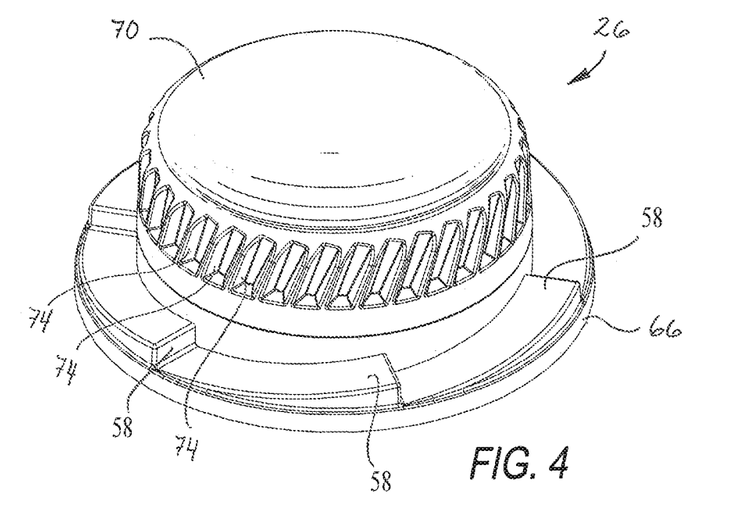
FIG. 4 is a perspective view of a bump knob of the trimmer head of FIG. 1.
Figure 5:
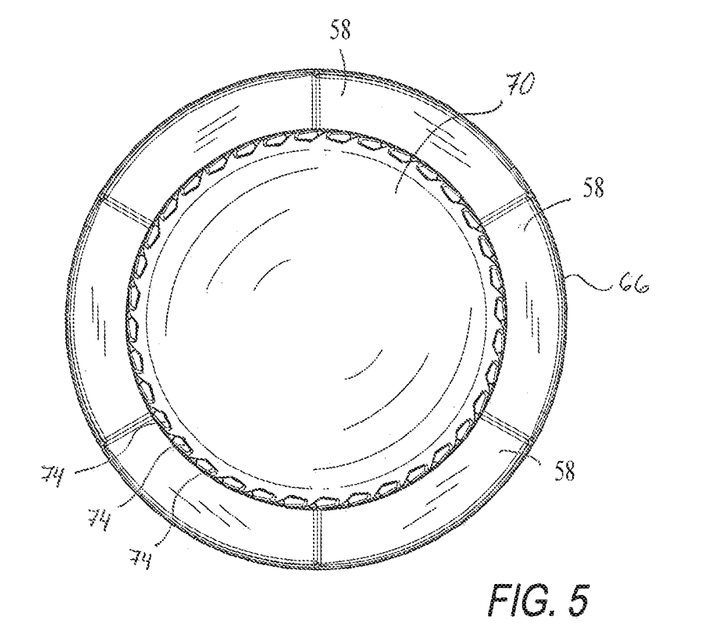
FIG. 5 is a top view of the bump knob of FIG. 4.

As shown in FIGS. 4-5, the bump knob 26 includes a radial flange 66 and an axially-projecting central portion 70. The bump projections 58 are on the flange 66. The central portion 70 extends out of the body 14 along the central axis A (FIG. 1) for contacting the ground to dispense line L during operation of the trimmer. In the illustrated construction, recesses 74 are defined to extend radially into an outer surface of the central portion 70 of the bump knob 26. The recesses 74 may assist a user in manually gripping and turning the bump knob 26. The illustrated recesses 74 are evenly circumferentially spaced about the central axis A.

Figure 6:
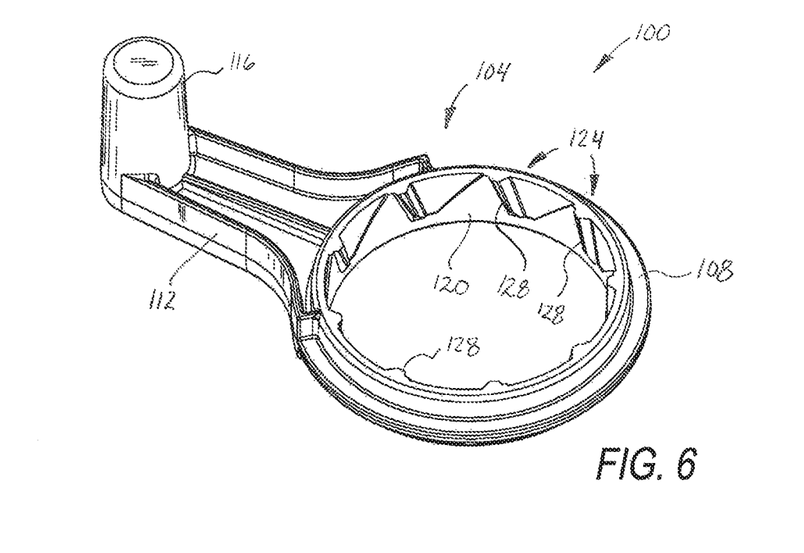
FIG. 6 is a perspective view of a winding mechanism.
Figure 7:
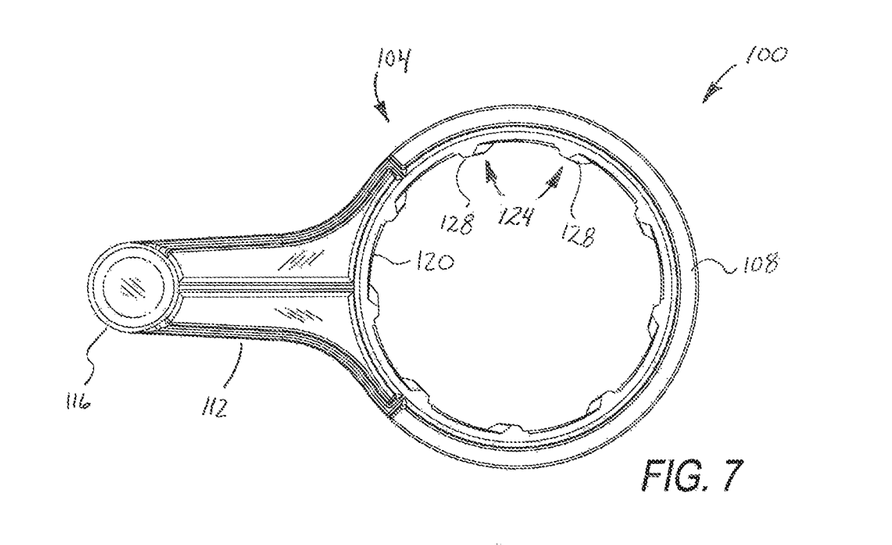
FIG. 7 is a top view of the winding mechanism of FIG. 6.
Figure 9:
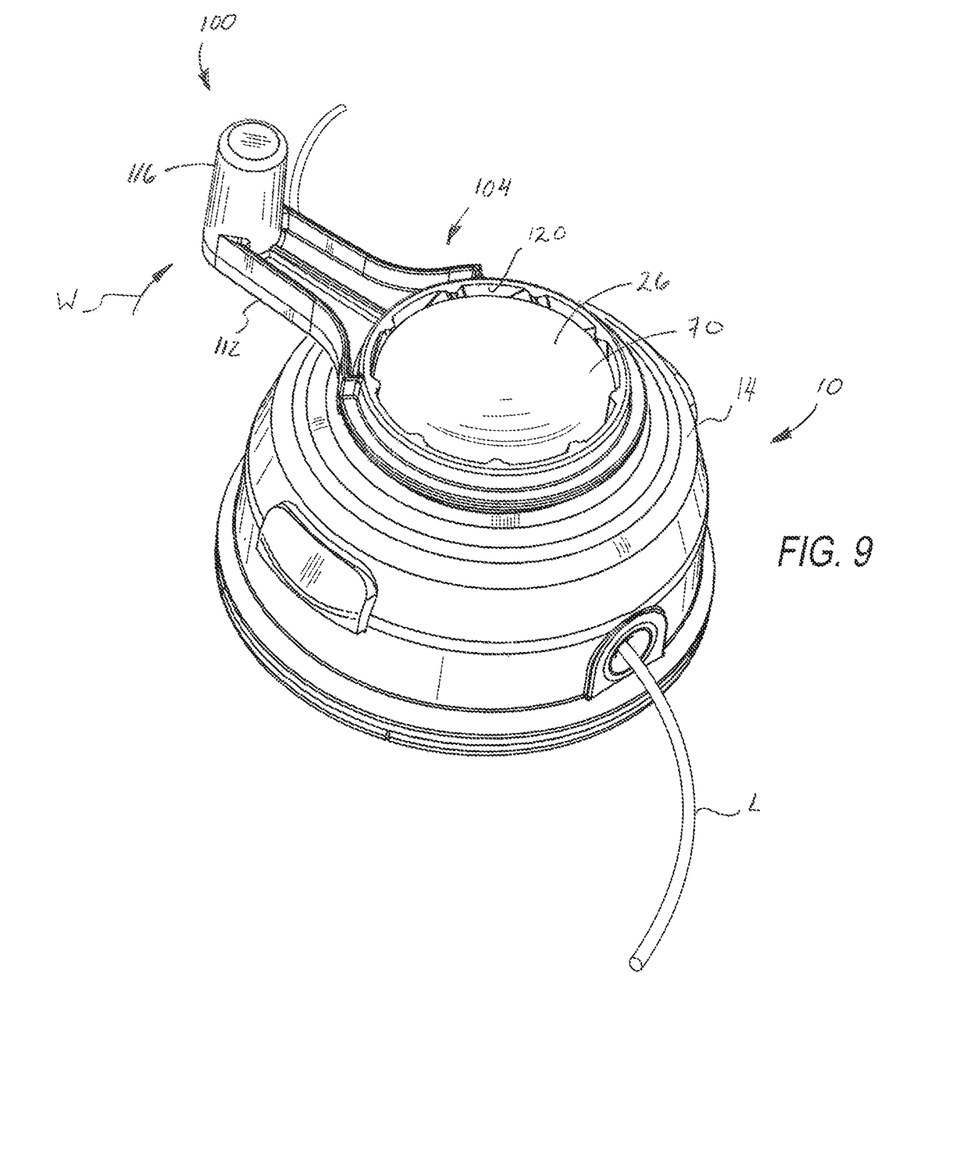
FIG. 9 is a bottom perspective view of the trimmer head of FIG. 1 illustrating the winding mechanism of FIG. 6 engaged on the bump knob of the trimmer head.

As shown in FIGS. 6-7, a winding mechanism 100 may improve (e.g., make quicker, easier, less tedious, less time-consuming, less tiring, etc.) winding of line(s) L onto the spool 22. In the illustrated construction, the winding mechanism 100 includes a crank 104 having a body 108, an arm 112 connected to the body 108, and a handle 116 engageable by the user to rotate the arm 112 and the body 108. In the illustrated construction, the body 108 is operable to rotatably drive the spool 22 (e.g., through engagement with the bump knob 26, as shown in FIG. 9), and the handle 116 is engageable by the user to rotate the arm 112 and the body 108 and, therethrough, the spool 22 via the bump knob 26. The handle 116 may be pivotable about its axis to facilitate turning of the crank 104. In some constructions, a ratchet mechanism (not shown) may be provided between the body 108 and the arm 112 to facilitate turning of the spool 22.

The body 108 defines a central opening 120 sized to receive the central portion 70 of the bump knob 26, as shown in FIG. 9. In the illustrated construction, the opening 120 is generally circular (FIG. 7) and the central portion 70 has a corresponding circular outer shape (FIG. 5).

Features 124 on the body 108 (e.g., projecting teeth 128) are constructed to engage complementary structure of the bump knob 26 (e.g., the recesses 74) to rotationally and drivingly connect the body 108 and the bump knob 26. In the illustrated construction, a number of projections or teeth 128 extend radially into the opening 120 from the body 108. The teeth 128 are spaced (e.g., evenly circumferentially) and sized so that each tooth 128 is received in one of the recesses 74 defined by the central portion 70 of the bump knob 26 (see FIG. 9). In the illustrated construction, there are more recesses 74 on the bump knob 26 than teeth 128 on the crank 104.

In other constructions (not shown), there may be an equal number of teeth 128 and recesses 74. In still other constructions (not shown), the teeth 128 and/or the recesses 74 may not be evenly circumferentially spaced. In other constructions (not shown), one or more projecting teeth (similar to the teeth 128) on the bump knob 26 may be engageable in complementary recesses (similar to the recesses 74) within the opening 120 on the body 108.

To facilitate winding of the line(s) L, the crank 104 is positioned to rotate the spool 22 and wind the line(s) L, as shown in FIG. 9. The body 108 of the crank 104 fits onto the central portion 70 of the bump knob 26. The central portion 70 is received in the opening 120, and the teeth 128 engage the recesses 74 to drivingly connect the crank 104 and the bump knob 26.

With the line(s) L inserted through the openings 30, the crank 104 is turned in the winding direction W to rotate the bump knob 26 and therethrough the spool 22 to wind the line(s) L onto the spool 22. The crank 104 is positioned and oriented relative to the line(s) L to avoid interfering with the line(s) L during winding.

After winding, the crank 104 is removed from the bump knob 26, and the trimmer head 10 is ready for operation. When not in use, the crank 104 may be stored separately from or in a storage location (not shown; e.g., a recess, a clip, etc.) on the trimmer to retain the crank 104 without interfering with operation of the trimmer.

In the illustrated construction of the trimmer head 10, the trimmer head 10 incorporates a one-way ratcheting mechanism. In alternate constructions, the trimmer head 10 may incorporate a bi-directional ratcheting mechanism, such as that described and illustrated in U.S. Pat. No. 8,910,387, the entire contents of which is hereby incorporated by reference. In such constructions, the crank 104 may be configured to rotate the bump knob 26 and the spool 22 either clockwise or counterclockwise to wind line L onto the spool 22.

With reference to FIGS. 4-7, in the illustrated construction, the teeth 128 of the crank 104 and the recesses 74 of the bump knob 26 are correspondingly angled relative to the central axes of the opening 120 and the bump knob 26. With this configuration, the bump knob 26 may be received only from one side of the body 108. This arrangement may be used to orient the crank 104 properly on the bump knob 26 such that the handle 116 extends axially away from the trimmer head 10. In this orientation, the crank 104, and specifically, the handle 116 will not generally interfere with the line(s) L or the body 14 during winding.

The illustrated angled arrangement of the teeth 128 and the recesses 74 may also facilitate engagement between and inhibit disengagement of the crank 104 and the bump knob 26 as the crank 104 is turned in the winding direction W. Specifically, the teeth 128 and recesses 74 are angled in a direction opposite to the winding direction W to inhibit axial movement of the crank 104 off the bump knob 26. In other constructions (not shown), the teeth 128 and recesses 74 may be parallel with the central axes of the opening 120 and the bump knob 26 such that the bump knob 26 may be received from either side of the body 108.

In addition to or as an alternative to the illustrated structure (i.e., the teeth 128 and the recesses 74), the features 124 may include structure (e.g., a clamp), material (e.g., friction-enhancing, elastomeric, etc.), combinations, etc., frictionally-engageable with the bump knob 26. For example, in some constructions (not shown), the opening 120 of the crank 104 and the central portion 70 of the bump knob 26 may have a corresponding non-circular shape (e.g., triangular, rectangular, hexagonal, etc.) such that the crank 104 drivingly engages the bump knob 26 with the crank 104.

In some constructions, the illustrated features 124 may be configured to drivingly engage different bump knobs (not shown) having different gripping arrangements or engagement structure. In some constructions (not shown), in order to interact with such different bump knobs, the features 124 may be similar to the adjustable structure of a universal socket wrench, such as that disclosed in U.S. Pat. Nos. 6,023,999 and 6,098,507, the entire contents of both of which are hereby incorporated by reference.

The invention may thus provide a mechanism (e.g., a removable crank) for winding line onto a string trimmer head.

One or more independent features and/or independent advantages of the invention may be set forth in the following claims:

What is claimed is:

1. A string trimmer head assembly for use with a string trimmer, the trimmer including a drive shaft, the assembly comprising:
   a trimmer head including a body connectable to and drivable by the drive shaft, a spool supported by the body, and a rotatable member rotatable relative to the body and engageable with the spool, a line being supportable by the spool; and
   a winding mechanism engageable with a portion of the head and operable, when the spool is supported by the body, to wind the line onto the spool.

2. The assembly of claim 1, wherein the mechanism includes a crank with a crank body engageable with the rotatable member to rotate the spool through the rotatable member.

3. The assembly of claim 2, wherein the rotatable member includes a bump knob engageable with the spool, the bump knob being engageable with a surface during operation of the trimmer to dispense the line from the spool, the crank being engageable with the bump knob.

4. The assembly of claim 3, wherein the crank further includes
   an arm connected to the crank body, and
   a handle connected to the arm and engageable by a user to pivot the crank and, therethrough, the bump knob and the spool to wind the line onto the spool.

5. The assembly of claim 3, wherein the crank body includes one of a projection and a recess and the bump knob includes the other of the projection and the recess, and wherein, when the crank body engages the bump knob, the projection engages the recess to drivingly connect the crank to the bump knob.

6. The assembly of claim 3, wherein the crank body defines an opening configured to receive the bump knob.

7. The assembly of claim 6, wherein the crank body includes a projection projecting into the opening and the bump knob defines a recess, and wherein, when the crank body engages the bump knob, the projection engages the recess to drivingly connect the crank to the bump knob.

8. The assembly of claim 7, wherein the crank body defines the opening extending between opposite axial sides of the crank body and along an axis extending between the opposite axial sides of the crank body, and wherein the projection and the recess are angled relative to the axis to inhibit the crank body from receiving the bump knob from one of the opposite axial sides of the crank body.

9. The assembly of claim 7, wherein the crank body includes a plurality of projections and the bump knob defines a plurality of recesses, each of the plurality of projections being engageable in a selected one of the plurality of recesses to drivingly connect the crank to the bump knob.

10. A method of winding a line in a string trimmer head, the head including a body connectable to and drivable by a drive shaft of a string trimmer, a spool supported by the body, and a bump knob engageable with the spool, the line being supportable by the spool, the method comprising:
   engaging the bump knob with a crank; and
   turning the crank to drive the bump knob to wind the line onto the spool.

11. The method of claim 10, wherein turning the crank includes
   turning the bump knob with the crank, and
   turning the spool through engagement with the bump knob.

\* \* \* \* \*